United States Patent
Sato

(10) Patent No.: US 10,857,871 B2
(45) Date of Patent: Dec. 8, 2020

(54) VEHICLE REAR STRUCTURE

(71) Applicant: TOYOTA JIDOSHA KABUSHIKI KAISHA, Toyota-shi, Aichi-ken (JP)

(72) Inventor: Fumiaki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/181,480

(22) Filed: Nov. 6, 2018

(65) Prior Publication Data

US 2019/0143802 A1  May 16, 2019

(30) Foreign Application Priority Data

Nov. 16, 2017  (JP) .................................. 2017-220895

(51) Int. Cl.
| | | |
|---|---|---|
| *B60K 6/40* | (2007.10) | |
| *B60K 6/28* | (2007.10) | |
| *B62D 25/08* | (2006.01) | |
| *B62D 27/06* | (2006.01) | |

(52) U.S. Cl.
CPC .................. *B60K 6/40* (2013.01); *B60K 6/28* (2013.01); *B62D 25/087* (2013.01); *B62D 27/065* (2013.01); *B60Y 2200/92* (2013.01)

(58) Field of Classification Search
CPC .......... B60K 6/40; B60K 6/28; B62D 27/065; B62D 25/087; B60Y 2200/92
USPC ............................ 296/203.04, 193.08, 29, 30
See application file for complete search history.

(56) References Cited

U.S. PATENT DOCUMENTS

| | | | | |
|---|---|---|---|---|
| 7,021,412 | B2* | 4/2006 | Koike .................. | H01M 2/1055 180/68.5 |
| 7,690,686 | B2* | 4/2010 | Hashimura .......... | B60K 15/063 280/782 |
| 8,051,934 | B2* | 11/2011 | Kiya ........................ | B60K 1/04 180/68.5 |
| 9,174,520 | B2* | 11/2015 | Katayama ............... | B60L 50/51 |
| 9,873,456 | B2* | 1/2018 | Hara ........................ | B60K 1/04 |
| 2007/0215399 | A1* | 9/2007 | Watanabe ................ | B60K 1/04 180/68.5 |

FOREIGN PATENT DOCUMENTS

JP           2005-247063 A       9/2005

* cited by examiner

*Primary Examiner* — Jason S Morrow
*Assistant Examiner* — E Turner Hicks
(74) *Attorney, Agent, or Firm* — Oliff PLC

(57) ABSTRACT

A vehicle rear structure prevents early deterioration of fastening portions on side members of a battery pack having a large mass caused by vertical vibrations during travelling of a vehicle. The vehicle rear structure includes a pair of side members disposed on right and left sides of the vehicle in a width direction of the vehicle and extending in a front-rear direction of the vehicle, and a battery pack whose bottom surface side is fastened to the side members. The vehicle rear structure also includes an upper back skeletal member extending in the width direction of the vehicle above the battery pack and fixed to the body of the vehicle, in which an upper surface side of the battery pack is fixed to the upper back skeletal member.

12 Claims, 8 Drawing Sheets

VEHICLE REAR STRUCTURE

CROSS REFERENCE TO RELATED APPLICATION

The entire disclosure of Japanese Patent Application No. 2017-220895 filed on Nov. 16, 2017 including the specification, claims, drawings, and abstract is incorporated herein by reference in its entirety.

TECHNICAL FIELD

The present disclosure relates to a vehicle rear structure, and more particularly to a vehicle rear structure in which a battery pack is disposed.

BACKGROUND

In an electric vehicle, a battery pack is disposed in a place like a luggage compartment located behind a cabin of the vehicle. JP 2005-247063 A discloses a structure in which a battery pack is fixed at the front and rear portions of a pair of kick-up portions that are curved upward at a pair of side members disposed on the side portions of the vehicle, thus preventing damage to the battery pack mounted in the cabin in a case of crashing of the vehicle from behind. The front part of the battery pack is fixed to a front bracket which is soldered to a cross member formed by connecting the front parts of the pair of kick-up portions, while the rear part of the battery pack is fixed to a bridge connecting the rear parts of the pair of kick-up portions.

SUMMARY

Technical Problem

In a case where the battery pack is fixed on the side members by fastening, the battery pack receives vertical vibrations during travelling of the vehicle. The vertical vibrations increase if the battery pack has a large mass, and a load of such vertical vibrations is concentrated at fastening portions of the side members. This may cause early deterioration of the fastening points. It is desired, therefore, to provide a vehicle rear structure capable of preventing early deterioration of a battery pack having a large mass due to vertical vibrations of the vehicle.

Solution to Problem

A vehicle rear structure according to the present disclosure includes a pair of side members disposed on right and left sides of a vehicle in a width direction and extending in a front-rear direction of the vehicle, a battery pack connected to the side members at a bottom surface side of the battery pack, and a rear upper skeletal member extending in the width direction of the vehicle above the battery pack and fixed to a body of the vehicle, in which the upper surface side of the battery pack is fixed to the rear upper skeletal member.

According to the vehicle rear structure configured as above, the bottom surface side of the battery pack is connected to the side members, while the upper surface side of the battery pack is fixed to the rear upper skeletal member. This allows distribution of load to the fastening portions of the bottom surface side and the fixed portions on the upper surface side even when the vertical vibrations are applied during travelling of the vehicle. Thus, the early deterioration of the fastening portions of the battery pack having a large mass due to the vertical vibrations during travelling of the vehicle can be prevented.

In the vehicle rear structure according to the present disclosure, the upper surface side of the battery pack is preferably fixed to the rear upper skeletal member via a fastening member. In the structure described above, the upper surface of the battery pack is not directly connected and fixed to the rear upper skeletal member, but is fixed via the fastening member, so that the fastening member can absorb displacement of the position of the battery pack when the battery pack having a large mass is disposed.

In the vehicle rear structure according to the present disclosure, the fastening member preferably includes a first surface and a second surface. The first surface is configured parallel to the upper surface of the battery pack and having a first fastening portion facing the upper surface of the battery pack. A second surface is configured integrally with the first surface at an angle corresponding to an angle formed between the upper surface of the battery pack and a front surface of the rear upper skeletal member, and having a second fastening portion disposed at an outer side of the vehicle in the width direction relative to the first fastening portion, the second fastening portion being also disposed above the vehicle in the vertical direction of the vehicle to face the front surface of the rear upper skeletal member.

In the structure described above, the first and second fastening portions of the fastening member are displaced from each other in the front-rear direction, the vertical direction, and the width direction of the vehicle. Thus, the fastening member can absorb three-dimensional positional displacement relative to the rear upper skeletal member when the battery pack having a large mass is disposed.

In the vehicle rear structure of the present disclosure, the first and second fastening portions each preferably have a long hole for fastening. This structure facilitates absorption of the three-dimensional positional displacement relative to the rear upper skeletal member when the battery pack having a large mass is disposed.

In the vehicle rear structure according to the present disclosure, the rear upper skeletal member includes an upper back peripheral portion and an upper back panel portion. The upper back peripheral portion partitions a cabin and a luggage compartment of the vehicle, has its peripheral portion connected to a rear wheel arch portion, and extends in vertical and width directions of the vehicle from the rear wheel arch portion. The upper back panel portion is connected to the upper back peripheral portion and extends to the upper side of the luggage compartment in front-rear and width directions of the vehicle above the luggage compartment to form an upper wall portion. The upper surface of the battery pack is preferably fastened via the fastening member to a corner portion provided between the extending portion in the width direction of the vehicle and the extending portion in the vertical direction of the upper back peripheral portion.

A sedan-type vehicle typically includes the upper back skeletal member. When viewed from the front of the vehicle, the upper back skeletal member is in a gate shape. In the structure described above, when the upper back structural member is used as the rear upper skeletal member, the battery pack can be disposed in a gate-shaped opening. The upper surface of the battery pack disposed in the opening of the gate shape portion is fastened to the corner portion of the upper back peripheral portion.

Although the gate shape structure may receive torsional deformation in a plane defined by the width direction and the vertical direction of the vehicle due to the load such as vibrations during travelling of the vehicle, the upper back structural member is fastened to the battery pack having a large mass with the fastening member at the corner portion of the gate shape portion. When the corner portion of the gate shape portion is fastened to the battery pack having a large mass, the displacement of the corner portion of the gate shape portion is prevented and the rigidity against the torsional deformation of the gate shape portion improves. The rigidity of the vehicle rear structure can also improve. Accordingly, the cross-section of the gate shape structure of the upper back structural member can be minimized, and its height in the vertical direction of the vehicle can be decreased. In a case where the height of the battery pack having a large mass is high in the vertical direction of the vehicle, the height of the upper surface position of the upper back structural member can be decreased, whereby the rear view from the driver seat of the vehicle can be guaranteed.

In the vehicle rear structure according to the present disclosure, the fastening member preferably has a bead portion formed in parallel with the direction connecting the first and second fastening portions. This structure with a bead portion improves rigidity against the torsional deformation of the upper back structural member.

Advantageous Effects of Invention

According to the vehicle rear structure of the present disclosure, the early deterioration of the fastening portion on the side members of the battery pack having a large mass due to the vertical vibrations during travelling of the vehicle can be prevented.

BRIEF DESCRIPTION OF DRAWINGS

An embodiment of the present disclosure will be described based on the following figures, wherein.

DESCRIPTION OF EMBODIMENT

An embodiment of the present disclosure is described below in detail with reference to the drawings. In the following, the vehicle rear structure of a sedan-type hybrid vehicle is described, but the description is given by way of illustration only. Alternatively, a rear structure of a vehicle other than the sedan-type vehicle that include a battery pack disposed in a luggage compartment may be used, in which a space where seats are arranged is regarded as a cabin and a space behind the cabin in the front-rear direction is regarded as a luggage compartment. For example, the rear structure of a wagon-type hybrid vehicle or a hatchback-type hybrid vehicle can be used in some cases.

In the following, an upper back structural member is described as a rear upper skeletal member, which is given by way of illustration only, but any other member that extends in the width direction of the vehicle above the battery pack and is fixed to an under or upper body of the vehicle can also be used.

The shapes, materials, and the like used herein are given by way of illustration, and may be changed, when appropriate, according to the specification or the like of the vehicle rear structure. In addition, the same reference signs are given to similar elements throughout the drawings, and the description thereof will not be repeated.

Figure 1:
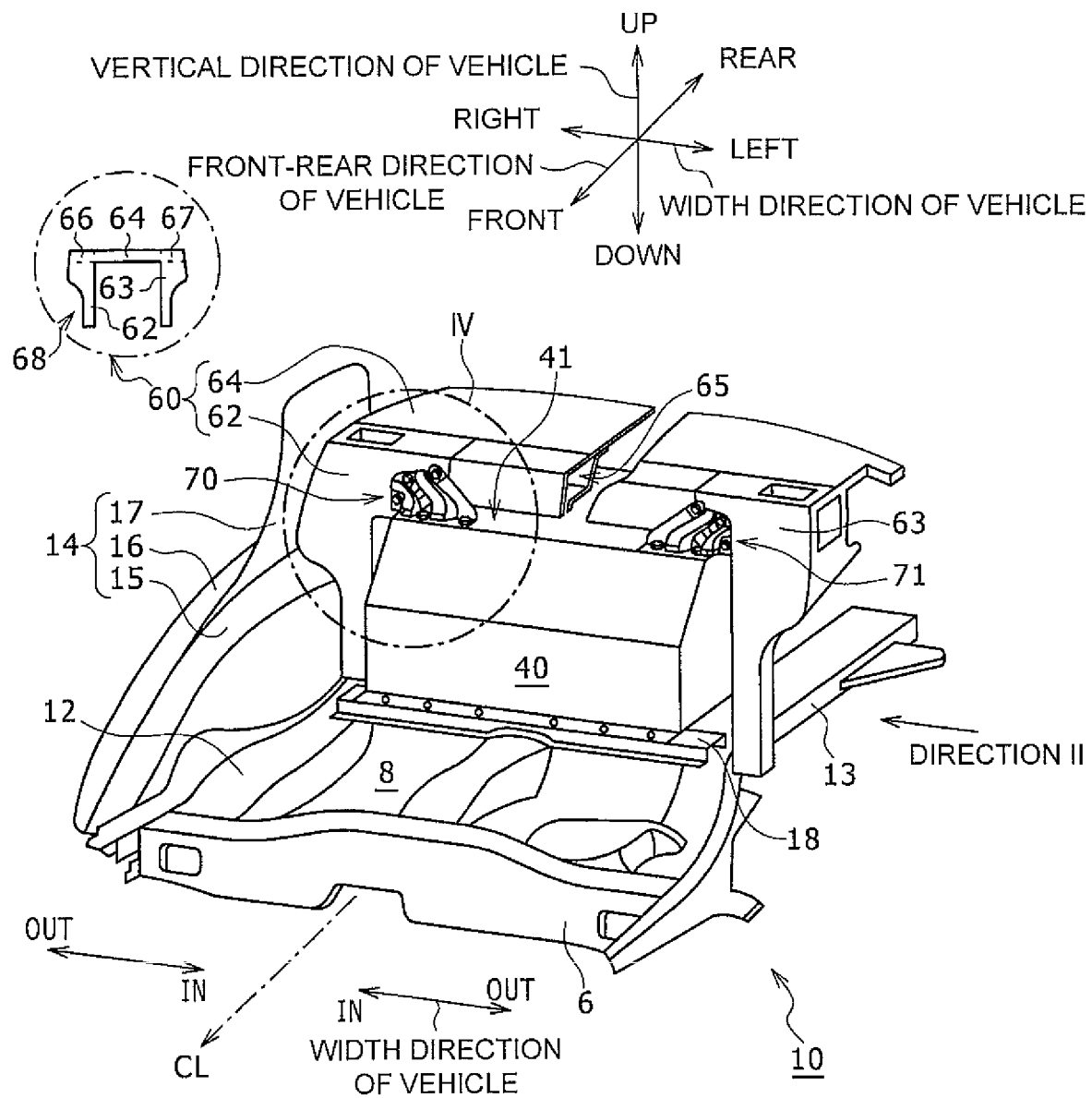
FIG. 1 is a perspective view of a vehicle rear structure according to an embodiment when viewed from the front of a vehicle in a front-rear direction.

FIG. 1 is a perspective view of a vehicle rear structure 10 according to an embodiment when viewed from the front of a sedan-type vehicle in a front-rear direction. Definition of the sedan-type vehicle differs depending on the viewpoint to be focused on, but is herein used as a three-box type vehicle including a cabin, an engine compartment in front of the cabin, and a luggage compartment behind the cabin. A rear door of the luggage compartment is provided under a rear glass. In the sedan-type vehicle, an upper surface of an upper back panel portion, which forms an upper wall portion of the luggage compartment, is set to a height not interrupting the rear view from a driver seat.

In the drawings, a width direction, a front-rear direction, and a vertical direction of the vehicle are indicated, as appropriate. Constituent elements of the vehicle are often disposed symmetrically in the width direction of the vehicle. Regarding the width direction, therefore, about a center axis CL of the vehicle with respect to the symmetrical arrangement of the width direction of the vehicle, a direction IN extends from the outside of the vehicle toward the center axis CL inside the vehicle, and a direction OUT extends from the center axis CL toward the outside of the vehicle. The right side and the left side of the vehicle in the width direction are referred to as the "right side in the width direction of the vehicle" and the "left side in the width direction of the vehicle". In the front-rear direction of the vehicle, a direction FR extends toward the front side of the vehicle, and the opposite direction extends toward the rear side of the vehicle. In the vertical direction of the vehicle, a direction UP extends upward away from the road surface, and the opposite direction extends toward the road surface. In some cases, the outside and inside of the vehicle, the right side and left side of the vehicle, the front side and rear side of the vehicle, and the front and rear side of the vehicle are simply referred to as outside, inside, right, left, front, and rear, respectively.

The vehicle rear structure 10 includes a pair of side members 12 and 13 disposed on left and right sides of the vehicle in the width direction and extending in the front-rear direction of the vehicle, a rear wheel arch portion 14, a widthwise connecting bar 18, a battery pack 40, an upper back structural member 60, and corner brace portions 70 and 71. FIG. 1 also shows a cabin-side cross member 6 and a part of an under body 8 of the cabin, although not included in the vehicle rear structure.

The pair of side members 12 and 13 is disposed on the right and left sides of the vehicle rear structure 10 about the center axis CL, and each extends in the front-rear direction of the vehicle. The side members 12 and 13 are constituent members of the under body 8 and each formed in a tubular shape having an approximately rectangular cross-section, which is not shown in the drawing. Thus, the side members 12 and 13 have rigidity which is effective when, for example, the vehicle receives an impact load due to crashing or the like, or receives vibrations continuously.

The rear wheel arch portions 14 are disposed on the right and left sides of the vehicle rear structure 10 about the center axis CL, each portion being a dome-like member covering a right or left rear wheel, not shown, of the vehicle. Although the rear wheel arch portions 14 are disposed symmetrically about the center axis CL for the right and left rear wheels, the rear wheel arch portion 14 for the left rear wheel is not shown herein and the rear wheel arch portion 14 for the right rear wheel is shown in FIG. 1. The rear wheel arch portion 14 includes a dome-like rear wheel arch inner 15 on the inner side in the width direction of the vehicle, and a rear wheel arch outer 16 on the outer side in the width direction of the vehicle. Further, the rear wheel arch portion 14 includes an extending portion 17 extending upward in the vertical direction of the vehicle from a seam of the rear wheel arch inner and outer 15 and 16. These three members are joined by welding and, with the dome-like shape, the rear wheel arch portion 14 typically has a high rigidity against deformation in the vehicle rear structure 10.

The widthwise connecting bar 18 is a member made of sheet metal having a hat-shaped cross-section to connect the left and right side members 12 and 13 in the width direction of the vehicle. The hat-shape refers to a shape having an upper surface protruding like a derby hat from a flat plate, as shown by a perspective view of FIG. 1 on the left side of the widthwise connecting bar 18 in the width direction of the vehicle. A connecting point is near the border of the cabin and the luggage compartment of the vehicle and, in the example of FIG. 1, on the upper surface of the left and right side members 12 and 13 corresponding to approximately the center portion of the left and right rear wheel arch portions 14 in the front-rear direction of the vehicle. A connecting method is fastening with bolts and nuts. The widthwise connecting bar 18 is a member which is used for fixing a rear seat 20 in the rear part of the vehicle (see FIG. 2). In fixing the bottom surface of the battery pack 40, the front side of the battery pack 40 in the front-rear direction of the vehicle is connected using the widthwise connecting bar 18.

The battery pack 40 includes a large capacity, i.e., high-voltage and large current, secondary battery inside the battery pack 40 for driving the vehicle. In a case of a plug-in hybrid vehicle in which the vehicle is charged at a charging station or the like, a cruising distance of the vehicle is mostly determined by the capacity of the second battery, so that the second battery has a substantially large capacity, a large size, and a large mass compared to the second battery of a typical hybrid vehicle. In the following, the battery pack 40 including a large capacity secondary battery having a large mass used in the plug-in hybrid vehicle is described. A nickel metal hydride assembled battery is used as a large capacity secondary battery. Alternatively, a lithium ion assembled battery may be used.

The upper back structural member 60 is a rear upper skeletal member extending in the width direction of the vehicle above the battery pack 40 and fixed to the body of the vehicle. The upper back structural member 60 includes upper back peripheral portions 62 and 63 and an upper back panel portion 64.

The upper back peripheral portions 62 and 63 are members disposed at a position partitioning the cabin and the luggage compartment of the vehicle, connected at their peripheral portions to the rear wheel arch portions 14, and extending from the rear wheel arch portions 14 in the vertical direction and the width direction of the vehicle. The upper back peripheral portions 62 and 63 are disposed symmetrically about the center axis CL. The upper back peripheral portion 62 is fixed unitarily by welding to the dome-like rear wheel arch inner 15 and the planar extending portion 17 on the side of the rear wheel arch portion 14 for the right rear wheel. Similarly, the upper back peripheral portion 63 is fixed integrally by welding to the dome-like rear wheel arch inner 15 and the planar extending portion 17 on the side of the rear wheel arch portion 14 for the rear left wheel.

The upper back panel portion 64 is connected to the upper back peripheral portions 62 and 63 and extends above the luggage compartment in the front-back direction and the width direction of the vehicle to form an upper wall portion of the luggage compartment. As shown in a partial broken-out section in FIG. 1, the front portion of the upper back panel portion 64 in the front-rear direction of the vehicle has a rectangular frame-like and box-shaped cross-section 65, and this box-shaped cross-section 65 extends in the width direction of the vehicle to be connected and united with the upper back peripheral portions 62 and 63. The rear portion of the upper back panel portion 64 behind the box-shaped cross-section 65 in the front-rear direction of the vehicle is in a plate shape and extends in the front-back direction and the width direction of the vehicle.

Both end portions of the box-shaped cross-section 65 of the upper back panel portion 64 are connected and fixed to the upper back peripheral portions 62 and 63, respectively, so that the upper back structural member 60 has a gate shape portion 68 when viewed from the front side in the front-rear direction of the vehicle, as indicated in a portion encircled by a dot-and-dash line of FIG. 1. The box-like cross-section 65 of the upper back panel portion 64 is connected to the upper back peripheral portions 62 and 63 at left and right corner portions 66 and 67 of the gate shape portion 68.

The corner brace portions 70 and 71 are provided at the corner portions 66 and 67, respectively, of the gate shape portion 68 of the upper back structural member 60 to fix the upper surface 41 of the battery pack 40 to the upper back structural member 60. The corner brace portions 70 and 71 will be described in detail later.

Next, fixing the bottom surface side of the vehicle rear structure 10 to the battery pack 40 during mounting is described with reference to FIGS. 2 and 3.

Figure 2:
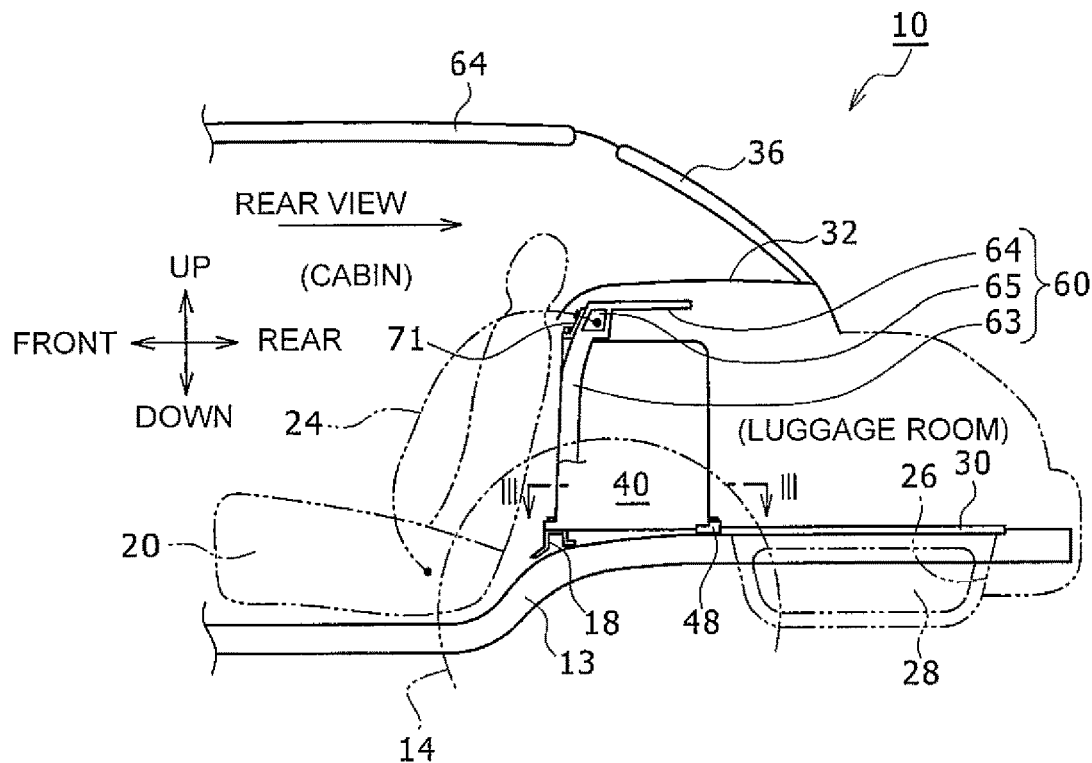
FIG. 2 is a side view when viewed from direction II of FIG. 1.

FIG. 2 is a side view of the vehicle rear structure 10 when viewed from the left in the width direction of the vehicle as indicated by the direction II in FIG. 1. The rear seat 20 is disposed in the rearmost side of the cabin. The rear seat 20 is connected to the widthwise connecting bar 18. One end of a seat belt 24 of the rear seat 20 is provided in the rear seat 20 itself, while the other end of the seat belt 24 is fixed to a portion of the box-like cross-section 65 of the upper back panel portion 64. The battery pack 40 is disposed right behind the rear seat 20 in the luggage compartment located behind the rear seat. In the luggage compartment, a floor pan 26 is provided by forming a recess in the floor surface of the luggage compartment on the under body 8 between the side members 12 and 13 further behind the battery pack 40. A spare tire 28 is stored in the recess of the floor pan 26, the upper surface of which is covered with a luggage board 30 to form the floor surface of the luggage compartment. A luggage trim 32 is disposed above the upper back panel portion 64. A rear glass 36 is placed on the inclined surface from a ceiling 34 of the vehicle downward to the luggage trim 32 and the upper back panel portion 64. The rear view through the rear glass 36 from the driver seat is limited by the luggage trim 32. Therefore, the height of the luggage trim 32 and the upper back structural member 60 disposed under the luggage trim 32 should be limited within a range not restricting the rear view, even when the height of the battery pack 40 increases in the vertical direction of the vehicle.

Figure 3:
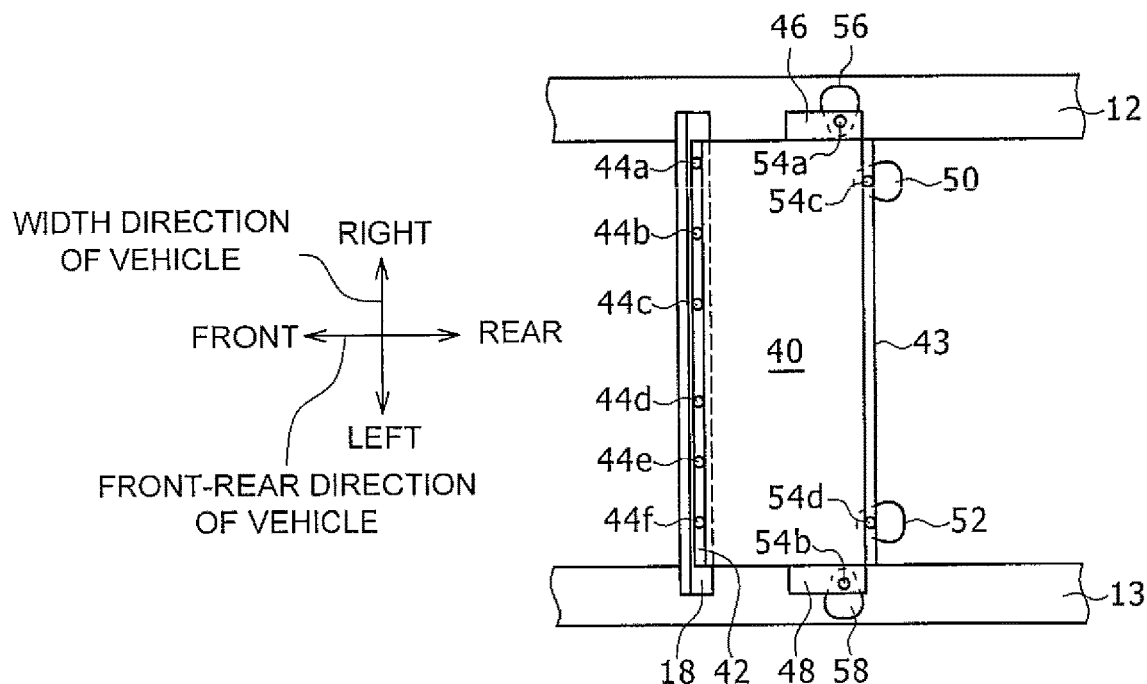
FIG. 3 is a cross-sectional view taken along line III-III of FIG. 2.

FIG. 3 is a plan view of a cross-section taken along line III-III of FIG. 2 when viewed from above in the vertical direction of the vehicle, to illustrate how the battery pack 40 is fixed to the bottom surface side in the vehicle rear structure 10. Flanges 42 and 43 are formed to project in front and rear directions, respectively, on the bottom surface side of the battery pack 40. Battery fastening brackets 46 and 48 are fastened to the right and left sides, respectively, of the battery pack 40. The flanges 42 and 43 and the battery fastening brackets 46 and 48 are used for fixing the bottom surface side of the battery pack 40.

The bottom surface of the battery pack 40 having a large mass is fixed using the following procedures. The mass of the battery pack 40 may differ depending on the settings for, e.g., a cruising distance of the vehicle in which the battery pack 40 is mounted. In one example for illustration, the mass of the battery pack 40 is from about 100 kg to 200 kg, which is so large that an operator cannot move it with their hands.

First, the flange 42 on the front part of the battery pack 40 is fastened to the widthwise connecting bar 18 with bolts and nuts at six fastening points 44a to 44f. Meanwhile, the battery fastening brackets 46 and 48 are fastened to brackets 56 and 58, respectively, which are attached to the side members 12 and 13, with bolts and nuts at two fastening points 54a and 54b. Further, the flange 43 on the rear part of the battery pack 40 is fastened to brackets 50 and 52 attached to the floor pan 26 in the luggage compartment with bolts and nuts at two fastening points 54c and 54d at both ends of the flange 43 in the width direction.

Thus, the bottom surface side of the battery pack 40 having a large mass is fixed to the side members 12 and 13 via the widthwise connecting bar 18 and the brackets 46 and 48. This fixing method is given only for illustration and may be changed, as appropriate, according to the specification of the vehicle rear structure 10, the battery pack 40, and the work tools.

Next, fixing the upper surface side of the battery pack 40 to the vehicle rear structure 10 during mounting of the battery pack 40 is described with reference to FIG. 1 again.

In FIG. 1, the corner brace portions 70 and 71 provided at the corner portions 66 and 67, respectively, of the gate shape portion 68 of the upper back structural member 60 are fixing portions for fixing the upper surface 41 of the battery pack 40 to the upper back structural member 60. With the corner brace portions 70 and 71, the upper surface side of the battery pack 40 is fixed to the upper back structural member 60, while the bottom surface side of the battery pack 40 having a large mass is fastened to the side members 12 and 13. This allows distribution of load to the fastening points on the bottom surface side and the upper surface side, even when the battery pack 40 receives vertical vibrations during travelling, thus preventing early deterioration of the fastening portions of the battery pack 40 having the large mass.

Thus, the battery pack 40 having the large mass is not subject to deformation, such as torsion, upon receiving the load such as vibrations during travelling of the vehicle, so that the displacement of the corner portions 66 and 67 of the gate shape portion 68 fastened to the battery pack 40 via the corner brace portions 70 and 71 is prevented. In addition, the upper back peripheral portions 62 and 63 on both sides of the gate shape portion 68 are fixed to the rear wheel arch portions 14 having a high rigidity. This improves the rigidity against torsional deformation in the plane (see FIGS. 10 and 12) defined by the width and vertical directions of the gate shape portion 68. The rigidity of the vehicle rear structure is also improved. Accordingly, the box-like cross-section 65 of the upper back structural member 60 can be minimized, and the height of the upper back structural member 60 in the vertical direction of the vehicle can be lowered. Thus, the increase in height of the upper back structural member 60 can be prevented, even when the vertical height of the vehicle of the battery pack 40 increases, to guarantee the rear view from the driver seat.

Figure 4:
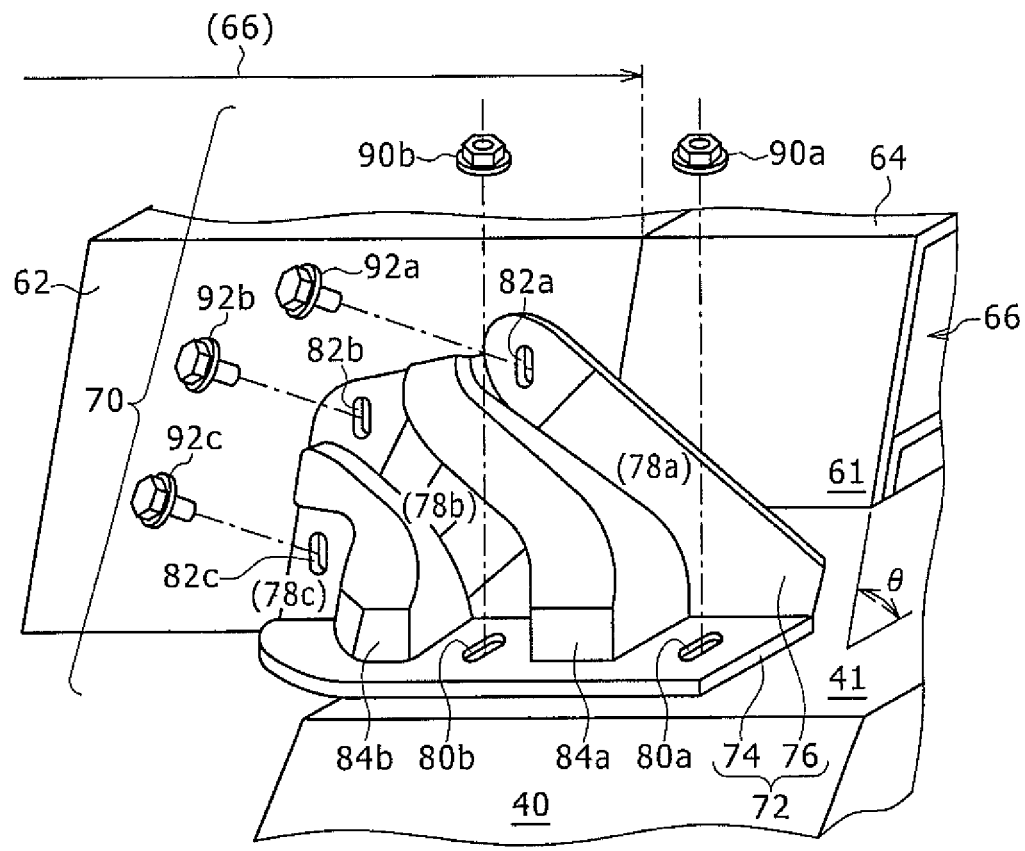
FIG. 4 is an enlarged view of part IV of FIG. 1.
Figure 4:
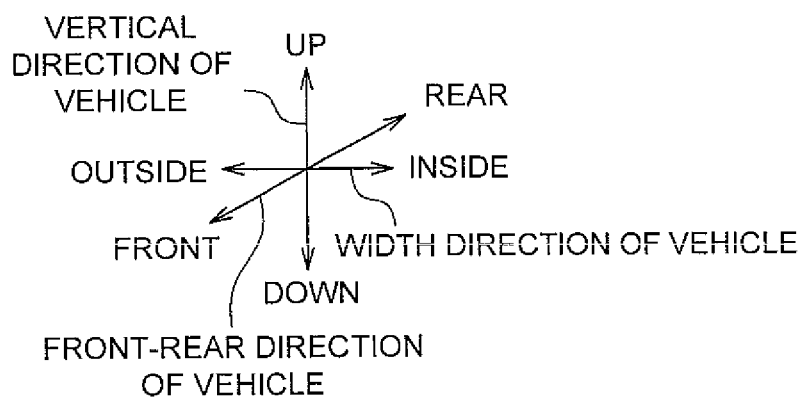

The corner brace portions 70 and 71 are arranged symmetrically about the center axis CL in the gate shape portion 68, that is, they have a symmetrical shape about the center axis CL. In the following, the corner brace portion 70 at the portion IV encircled by a dash-and-dot line in FIG. 1 is described. FIG. 4 is an enlarged view of the portion IV of FIG. 1.

With reference to FIG. 4, the relationship between the upper surface 41 of the battery pack 40 and the front surface 61 of the corner portion 66 of the upper back structural member 60 is described. The upper surface 41 of the battery pack 40 is a surface on the upper side of the battery pack 40 in the vertical direction of the vehicle. The front surface 61 of the corner portion 66 of the upper back structural member 60 is of facing frontward in the front-rear direction of the vehicle. At the corner portion 66 of the upper back structural member 60, the upper back peripheral portion 62 and the upper back panel portion 64 are integrated, so that the front surface of the upper back panel portion 74 is shown as the front surface 61 of the corner portion 66 in FIG. 4.

As shown in FIG. 4, the front surface 61 of the corner portion 66 of the upper back structural member 60 is inclined at an angle θ relative to the upper surface 41 of the battery pack 40. In the example of FIG. 4, the angle θ is inclined in a direction falling toward the rear side from the front side of the vehicle in the front-rear direction, and the angle θ is an acute angle. Assuming that a plane formed by the front-rear direction and the width direction of the vehicle is referred to as a vehicle horizontal plane, then the upper surface 41 of the battery pack 40 is arranged parallel to the vehicle horizontal plane, and the corner portion 66 is disposed at an angle θ relative to the vehicle horizontal plane when the front surface 61 of the corner portion 66 is inclined. Herein, the angle θ is set to an acute angle only for the illustration purpose, but the angle θ may be set to 90 degrees or an obtuse angle.

The corner brace portion 70 includes a mounting plate 72 acting as a fastening member, first fasteners 90a and 90b for fastening the attaching plate 72 to the upper surface 41 of the battery pack 40, and second fasteners 92a, 92b, and 92c for fastening the mounting plate 72 to the corner portion 66.

The mounting plate 72 is a bent plate member including a first surface 74 and a second surface 76 that is inclined relative to the first surface 74 at the angle θ and integrated with the first surface 74. As shown in FIG. 4, when the first surface 74 is put on the upper surface 41 of the battery pack 40, the second surface 76 is parallel to the front surface 61 of the corner portion 66 and, by being appropriately aligned, the second surface 76 can abut on the front surface 61 of the corner portion 66.

Two fastening portions 80a and 80b are provided on the first surface 74 of the mounting plate 72 as fastening holes for the first fasteners 90a and 90b. Similarly, three fastening portions 82a, 82b, and 82c are provided on the second surface 76 as fastening holes for the second fasteners 92a, 92b, and 92c, respectively. In the following, these fastening portions are sorted such that the two fastening portions provided on the first surface 74 are referred to as the first fastening portions 80a and 80b, and the three fastening portions provided on the second surface 76 are referred to as the second fastening portions 82a, 82b, and 82c.

Bead portions 84a and 84b are formed over the first and second surfaces 74 and 76 of the mounting plate 72. The bead is a groove having an appropriate depth for the purpose of increasing the surface strength for the same material of the thin plate and the same plate thickness. With the beads added, the surface strength increases against bending, twisting, or the like of the thin plate. In the bead portions 84a and 84b, grooves are formed on the back side of the first and second surfaces 74 and 76, and convex portions corresponding the grooves are formed, as shown in FIG. 4. The bead portions 84a and 84b both extend diagonally inward from the outside in the width direction of the vehicle and vertically from the upper side toward the lower side of the vehicle.

The two bead portions 84a and 84b extending diagonally in the vertical and width directions over the first and second surfaces 74 and 76 serve to divide the mounting plate 72 into three fastening regions. The three fastening regions are individually referred to as a first fastening region 78a, a second fastening region 78b, and a third fastening region 78c. The first fastening region 78a includes the first fastening portion 80a on the first surface 74 and the second fastening portion 82a on the second surface 76. The second fastening region 78b includes the first fastening portion 80b on the first surface 74 and the second fastening portion 82b on the second surface 76. The third fastening region 78c includes the second fastening portion 82c on the second surface 76, but no fastening portion is formed on the first surface 74.

In the first fastening region 78a, the second fastening portion 82a is placed on the outer side in the width direction of the vehicle and on the upper side in the vertical direction of the vehicle relative to the first fastening portion 80a.

Similarly, in the second fastening portion 78b, the second fastening portion 82b is placed on the outer side in the width direction of the vehicle and on the upper side in the vertical direction of the vehicle relative to the first fastening portion 80b.

On the mounting plate 72 serving as the fastening member, the second surface 76 is inclined rearward in the vehicle relative to the first surface 74 at the angle θ. In the first fastening region 78a, therefore, the second fastening portion 82a of the second surface 76 is located at a position displaced three-dimensionally relative to the first fastening portion 80a of the first surface 74. Similarly, in the second fastening region 78b, the second fastening portion 82b of the second surface 76 is located at a position displaced three-dimensionally relative to the first fastening portion 80b of the first surface 74.

In other words, the second fastening portions 82a and 82b fastened to the front surface 61 of the corner portion 66 of the upper back structural member 60 are respectively located at three-dimensionally different positions relative to the first fastening portions 80a and 80b fastened to the upper surface 41 of the battery pack 40. If such a relatively three-dimensionally different positioning between the front surface 61 of the corner portion 66 of the upper back structural member 60 and the upper surface 41 of the battery pack 40 is not achieved as designed, it is difficult for the operator to manually adjust the position of the battery pack 40 having the large mass. To solve this issue, all of the first and second fastening portions 80a and 80b and 82a to 82c are shaped into long holes, as shown in FIG. 4. The longitudinal direction of the long holes of the first fastening portions 80a and 80b is parallel with the front-rear direction of the vehicle, while the longitudinal direction of the long holes of the second fastening portions 82a, 82b, and 82c is parallel with the vertical direction of the vehicle. Such settings of the longitudinal directions of the long holes are only for illustration, and may be changed, as appropriate, in accordance with the fixing method or the like of the bottom surface side of the battery pack 40.

As described above, the first fastening portions 80a and 80b and the second fastening portions 82a to 82c of the mounting plate 72 can, therefore, be formed as long holes, each formed appropriately to absorb three-dimensional position displacement of the battery pack 40 having the large mass disposed relative to the upper back structural member 60.

The first fasteners 90a and 90b are made of flanged nuts. The second fasteners 92a, 92b, and 92c are made of bolts with washers.

Figure 5:
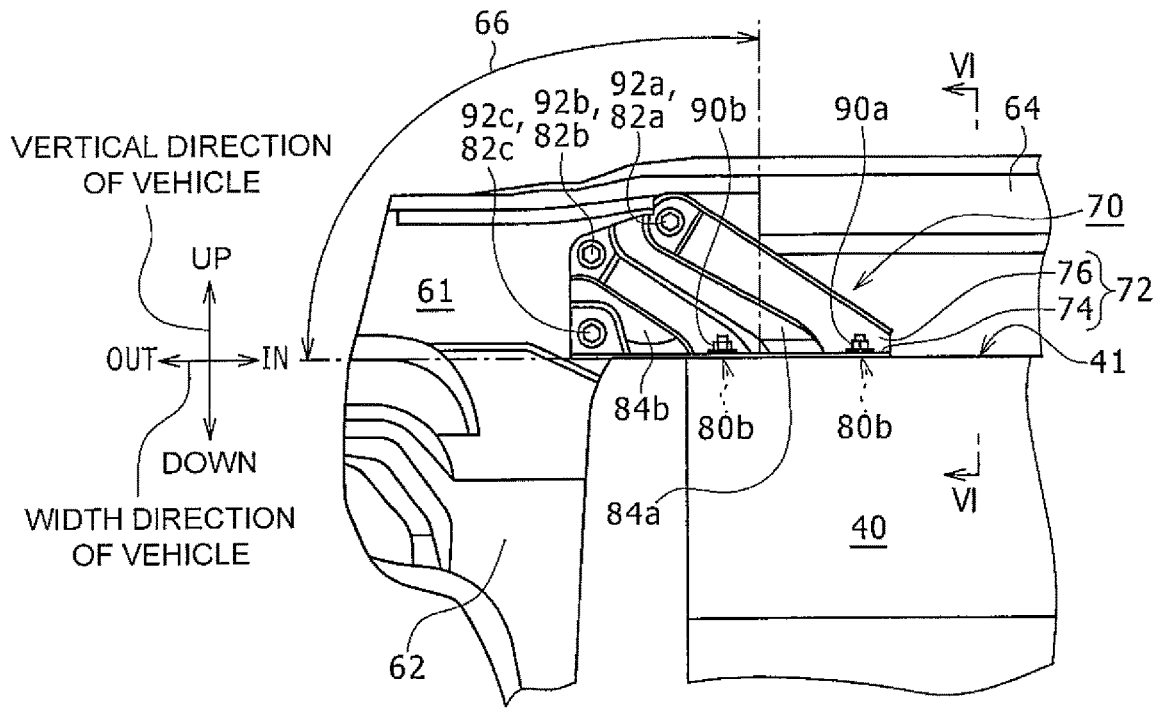
FIG. 5 is a front view of the part IV of FIG. 1 when viewed from the front of the vehicle in the front-rear direction.

FIG. 5 is a front view of the part IV of FIG. 1 when viewed from the front in the front-rear direction of the vehicle. The first fasteners 90a and 90b are fastened with bolts protruding from the upper surface 41 of the battery pack 40, while the second fasteners 92a, 92b, and 92c are fastened into screw holes formed in the front surface 61 of the corner portion 66. Thus, the upper surface 41 side of the battery pack 40 is fastened and fixed to the corner portion 66 of the upper back structural member 60 with the first fasteners 90a and 90b and the second fasteners 92a to 92c via the mounting plate 72 which serves as the fastening member.

In FIG. 5, the bead portions 84a and 84b of the corner brace portion 70, which is fastened to the right corner portion 66 in the width direction of the vehicle, extend in a direction toward the center portion of the battery pack 40 from the corner portion 66. Similarly, the bead portions 84a and 84b of the corner brace portion 71, which is fastened to the left corner portion 67 in the width direction of the vehicle, extend in a direction toward the center portion of the battery pack 40 from the corner portion 67 (see FIG. 1). The bead portions 84a and 84b are more rigid in directions orthogonal to the extending directions of the bead portions 84a and 84b. With the bead portions 84a and 84b, therefore, the rigidity against the torsional deformation of the gate shape portion 68 of the upper back structural member 60, which may occur in the plane defined by the width direction and the vertical direction of the vehicle, can improve.

Figure 6:
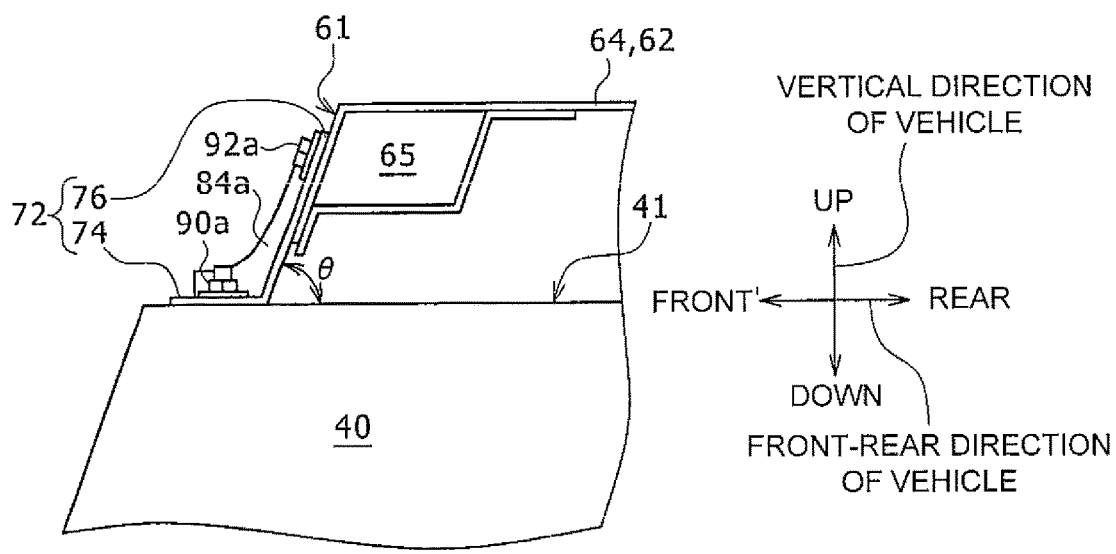
FIG. 6 is a cross-sectional view taken along line VI-VI of FIG. 5.

FIG. 6 is a cross-sectional view taken along line VI-VI of FIG. 5. FIG. 6 shows that the front surface 61 of the corner portion 66 of the upper back structural member 60 is inclined at the acute angle θ relative to the upper surface 41 of the battery pack 40 in a direction falling rearward from the front side in the front-rear direction of the vehicle at the angle θ.

An advantageous effect of the vehicle rear structure 10 described above will be described in detail below in comparison with a prior art technique with reference to FIGS. 7 to 15.

Figure 7:
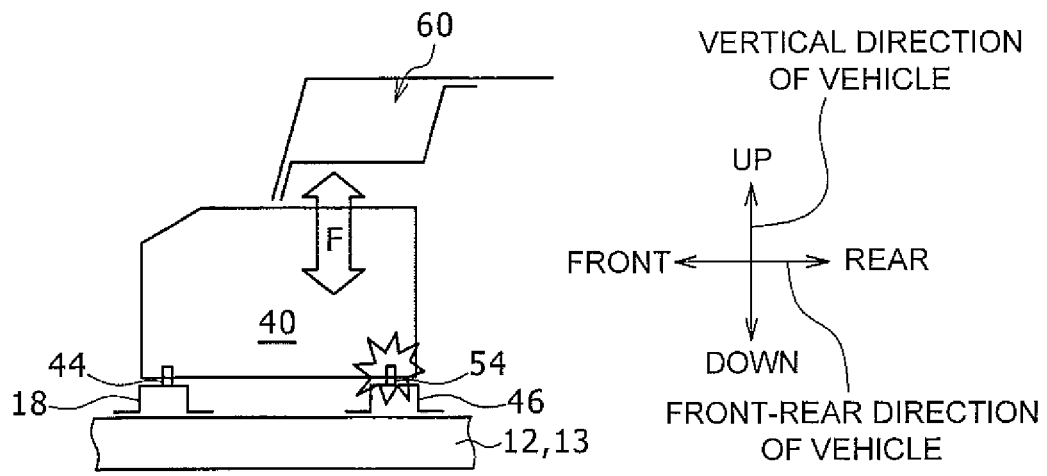
FIG. 7 shows a comparative example in which a battery pack is fixed to side members only at the bottom surface side of the battery pack while the vehicle generates vertical vibrations during travelling.
Figure 8:
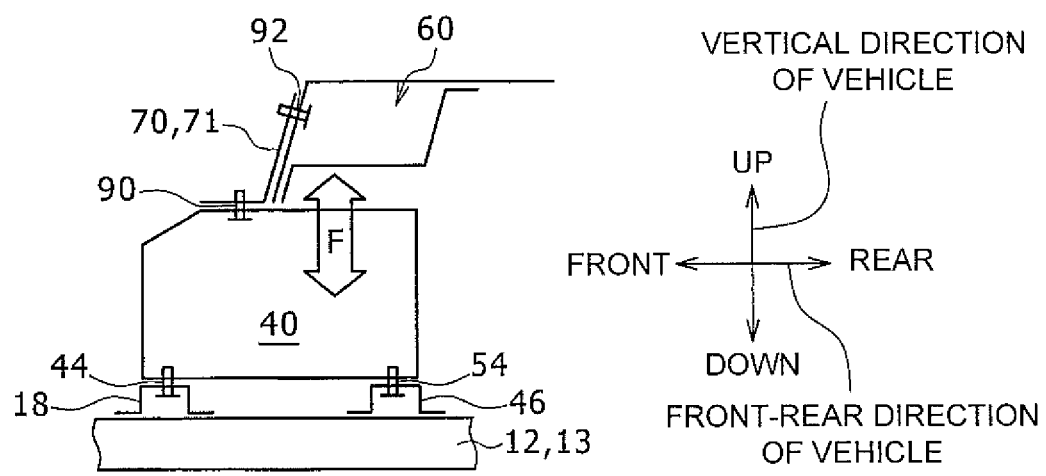
FIG. 8 shows the vehicle rear structure according to the embodiment when the vehicle generates vertical vibrations during travelling.

FIGS. 7 and 8 show an advantageous effect when the battery pack 40 is fastened at the upper surface 41 as well as at the bottom surface side. The two drawings correspond to FIG. 2 and show cross-sections of the plane defined by the front-rear direction and the vertical direction of the vehicle corresponding to FIG. 2. FIG. 7 shows a comparative example in which only the bottom surface side of the battery pack 40 is fixed to the side members 12 and 13 at the fastening points 44 and 54. In the structure of FIG. 7, the load is concentrated on the fastening points 44 and 54 on the bottom surface side of the battery pack 40 when the vehicle generates vertical vibrations F during travelling. In the case of the large-mass battery pack 40, the load is highly concentrated, causing early deterioration of the fastening points 44 and 54 compared to the case of a small-mass battery pack.

FIG. 8 shows the structure of FIG. 6 in which the battery pack 40 is fixed to the upper back structural member 60 at the upper surface 41 with the fasteners 90 and 92 using the corner brace portions 70 and 71. In this structure, the battery pack 40 is fixed with the fasteners 90 and 92 on the upper surface 41, as well as fixed at the fastening points 44 and 54 on the bottom surface side, allowing the load to be distributed even when the vehicle generates the vertical vibrations F during travelling. As a result, the occurrence of early deterioration of the fastening points 44 and 54 and the fasteners 90 and 92 can be prevented in the large-mass battery pack 40.

FIGS. 9 to 12 show the advantageous effect of the upper back structural member 60 being fixed to the battery pack 40 via the corner brace portions 70 and 71. These drawings are front views of the vehicle in the front-rear direction, with the upper back structural member 60 being illustrated as a model and indicated by a bold line.

Figure 9:
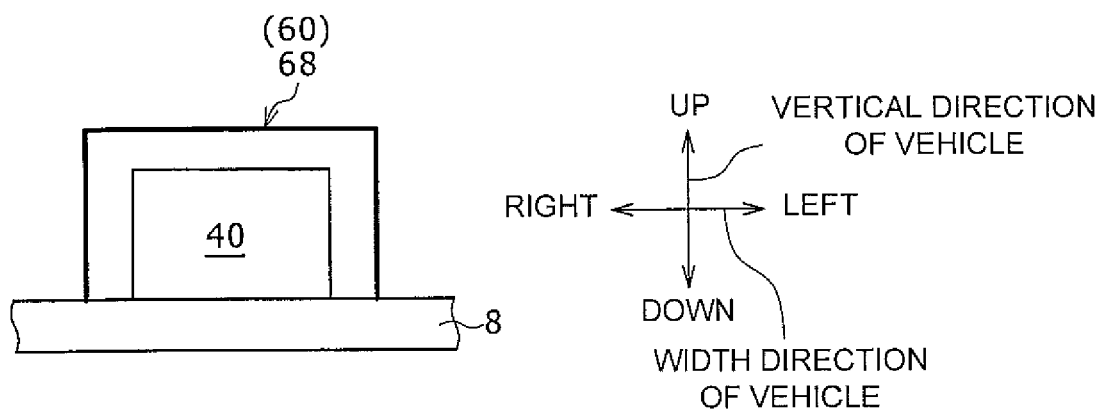
FIG. 9 shows a comparative example in which a corner brace portion is not used.
Figure 10:
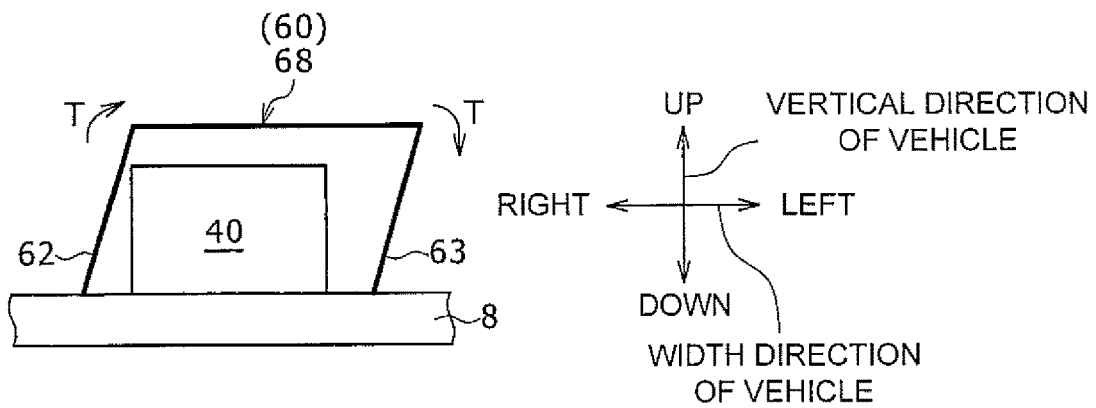
FIG. 10 shows a case in which, in the structure of FIG. 9, the vehicle travels and applies vertical vibrations to the battery pack and the upper back structural member, thus applying a load to generate torsion to the upper back structural member.

FIGS. 9 and 10 show a comparative example in which the corner brace portions 70 and 71 are not used. In FIG. 9, both the battery pack 40 and the upper back structure 60 are at rest while the vehicle is not travelling. In FIG. 10, the vehicle travels, applying vertical vibrations to the battery pack 40 and the upper back structural member 60. Since the battery pack 40 has a large mass, the torsional deformation does not occur, and the upper back structural member 60 receives a load T generating the torsional deformation. The upper back peripheral portions 62 and 63 on both sides of the gate shape portion 68 of the upper back structural member 60 serve as fixed ends, being fixed to the rear wheel arch portions 14 having the high rigidity. As a result, the torsional deformation occurs in the plane defined by the width direction and the vertical direction of the vehicle in the gate shape portion 68 of the upper back structural member 60 that receives the load T.

Figure 11:
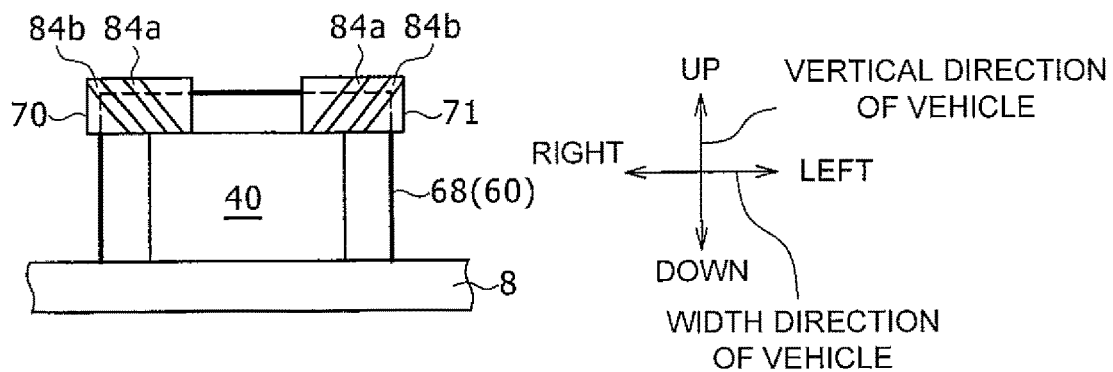
FIG. 11 shows a relationship among the battery pack, the upper back structural member, and a corner brace portion in the vehicle rear structure according to the embodiment.
Figure 12:
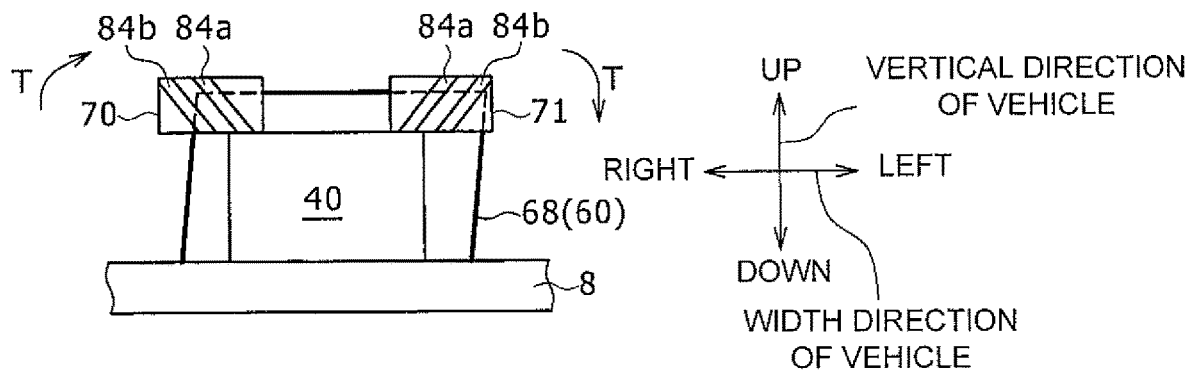
FIG. 12 shows a case in which, in the structure of FIG. 11, the vehicle travels and applies vertical vibrations to the battery pack and the upper back structural member, thus applying a load to generate torsion to the upper back structural member.

FIGS. 11 and 12 show the upper back structural member 60 fixed to the battery pack 40 via the corner brace portions 70 and 71 in the structure of FIGS. 1 to 6. Similar to FIGS. 9 and 10, FIGS. 11 and 12 are front views of the vehicle in the front-rear direction in which the upper back structural member 60 is illustrated as a model and indicated by a bold line. In addition, the directions of the bead portions 84a and 84b extending in the corner brace portions 70 and 71 are shown schematically. FIG. 11 corresponds to FIG. 9 in which the vehicle does not travel and both the battery pack 40 and the upper back structural member 60 are at rest. FIG. 12 corresponds to FIG. 10 in which the vehicle travels and applies vertical vibrations to the battery pack 40 and the upper back structural member 60. Torsion does not occur because the battery pack 40 has a large mass. Although the load T that generates torsion is applied to the upper back structural member 60, the occurrence of the torsional deformation in the gate shape portion 68 of the upper back structural member 60 that has received the load T can be prevented, because the upper back structural member 60 is fixed to the large-mass battery pack 40 via the corner brace portions 70 and 71. The torsional deformation in the gate shape portion 68 can further be prevented, because the bead portions 84a and 84b extend in such a direction as to prevent deformation due to the load T. The bead portions 84a and 84b of the corner brace portion 70 resist the load T being exerted in the direction of the arrow in FIG. 12 to prevent the torsional deformation, while the bead portions 84a and 84b of the corner brace portion 71 resist the load T being exerted in the direction opposite to arrows shown in FIG. 12 to prevent the torsional deformation.

Figure 13:
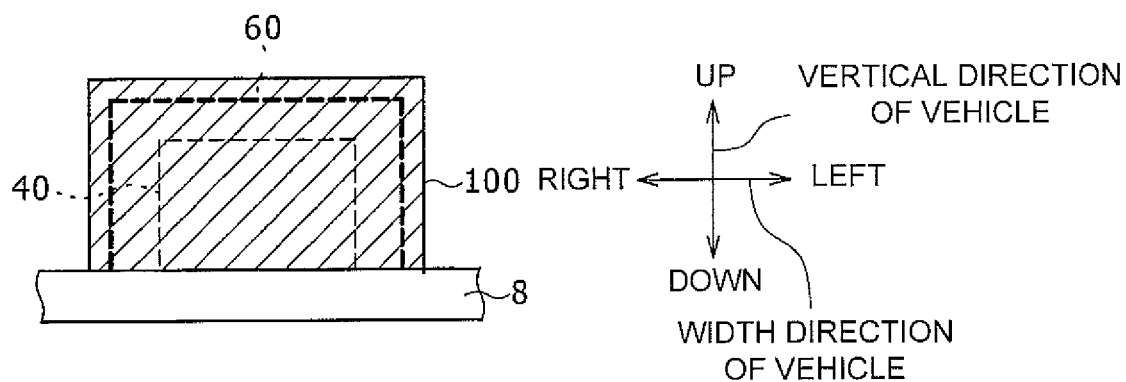
FIG. 13 shows a reference example in which a partition panel is used instead of the corner brace portion.
Figure 14:
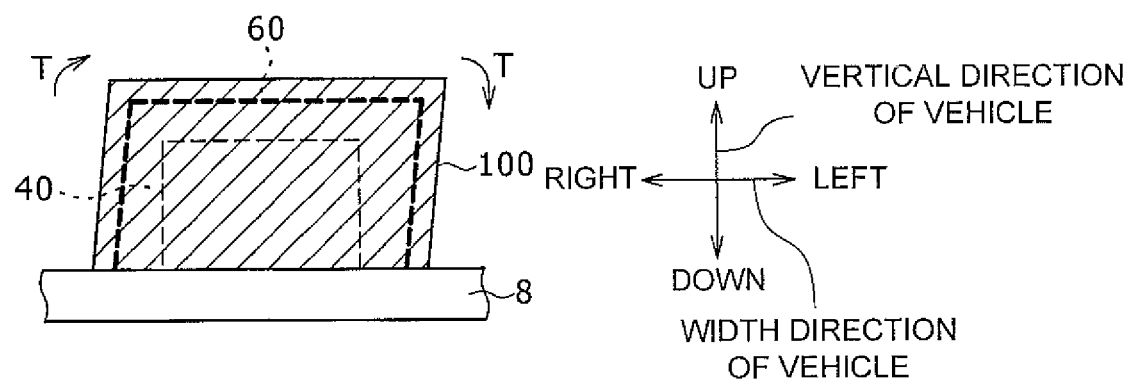
FIG. 14 shows a case in which the vehicle travels and applies vertical vibrations to the battery pack and the upper back structural member, thus applying a load to generate torsion to the upper back structural member in the structure of FIG. 13.

FIGS. 13 and 14 show a reference example in which a partition panel 100 is disposed between the cabin and the luggage compartment instead of the corner brace portions 70 and 71. The battery pack 40 and the upper back structural member 60 are both fixed to the partition panel 100. FIGS. 13 and 14 are front views of the vehicle in the front-rear direction in which the battery pack 40 and the upper back structural member 60 are disposed behind and fixed to the partition panel 100. The upper back structural member 60 is illustrated as a model and indicated by a bold line.

FIG. 13 corresponds to FIGS. 9 and 11 in which the vehicle does not travel and the partition panel 100, the battery pack 40, and the upper back structural member 60 are at rest. FIG. 14 corresponds to FIGS. 10 and 12 in which the vehicle travels and applies vertical vibrations to the partition panel 100, the battery pack 40, and the upper back structural member 60. The partition panel 100 receives the load T that generates torsion, but the torsional deformation is prevented because the partition panel 100 is fixed to the battery pack 40 having the large mass. The partition panel 100 is a plate-like member that is in a size for partitioning the cabin and the luggage compartment, thus achieving a larger effect of preventing the torsional deformation, when compared to the case of FIG. 12 using the corner brace portions 70 and 71. However, the partition panel 100 is a large plate-like member, so that the cost and the mass of the partition panel 100 are higher than the corner brace portions 70 and 71. In contrast, the vehicle rear structure 10 using the corner brace portions 70 and 71, which are described with reference to FIGS. 1 to 6, can reduce the cost and has a small mass compared to the partition panel 100.

Figure 15:
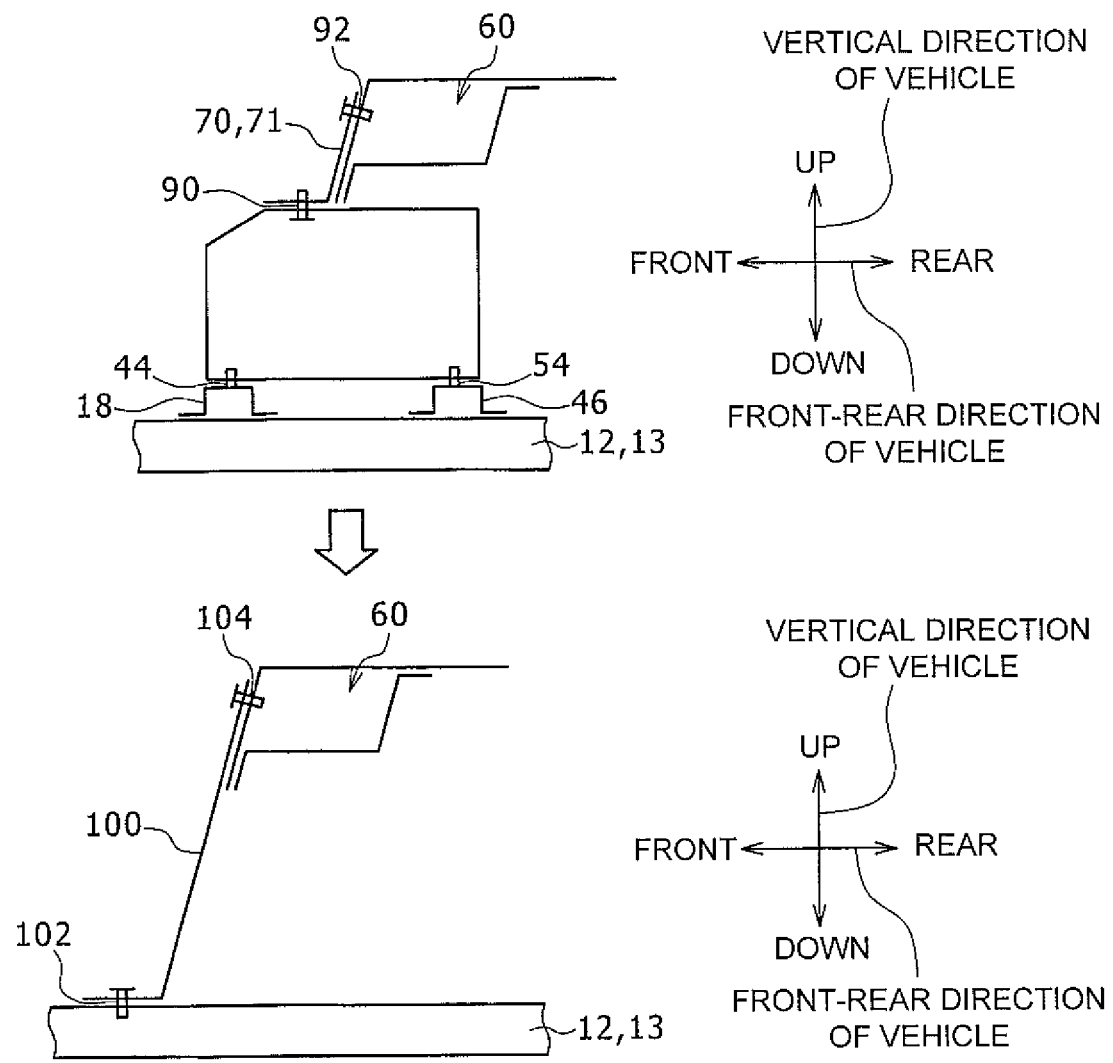
FIG. 15 is views showing that the structure with the corner brace portion can be similar to the structure with the partition panel in the vehicle rear structure according to the embodiment.

FIG. 15 shows that the structure with the corner brace portions 70 and 71 can be similar to the structure with the partition panel 100. The upper view of FIG. 15 is identical to FIG. 6, while the lower view of FIG. 15 is made to be similar to the model with the partition panel 100 based on the upper view. In the model with the partition panel 100, the bottom surface side of the partition panel 100 is fastened to the side members 12 and 13 with a fastener 102, while the upper end side of the partition panel 100 is fastened to the upper back structural member 60 with the fastener 104. Assuming that the battery pack 40 having a large mass is regarded as a part of the partition panel 100, the upper and lower views of FIG. 15 can be deemed as showing substantially same structure. What is different in these two views is a difference in the number of fasteners which is larger in the structure of the upper view. From these models, it can be learned that the vehicle rear structure 10 using the corner brace portions 70 and 71 is effective in terms of cost, although the torsional deformation preventing effect of the partition panel 100 is relatively small.

Although the upper back structural member 60 has been described as the rear upper skeletal member, any other member that extends in the width direction of the vehicle above the battery pack 40 and is fixed to the under body 8 of the vehicle can be used. For example, a partition panel portion that partitions the cabin and the luggage compartment, is connected to the rear wheel arch portions 14 at the peripheral portions, extending in the width direction and the vertical direction of the vehicle, and including an opening at the center, can be used as the rear upper skeletal member. In some cases, a beam-like member extending in the width direction of the vehicle above the battery pack 40 and fixed to the upper body of the vehicle may be used as the rear upper skeletal member.

In the vehicle rear structure 10 as described above, the bottom surface side of the battery pack 40 is fastened to the side members 12 and 13, and the upper surface side 41 of the battery pack 40 is fixed to the upper back structural member 60 which serves as the rear upper skeletal member. This structure allows the distribution of the load to the fastening portions on the bottom surface side of the upper surface side, and prevents early deterioration of the fasteners of the battery pack 40 having the large mass during travelling of the vehicle.

The invention claimed is:

1. A vehicle rear structure, comprising:
   a pair of side members disposed on right and left sides of a vehicle in a width direction of the vehicle and extending in a front-rear direction of the vehicle;
   a battery pack whose bottom surface side is fastened to the side members; and
   a rear upper skeletal member extending in the width direction of the vehicle above the battery pack and fixed to a body of the vehicle, wherein
   the rear upper skeletal member has a gate shape portion that extends in the width direction of the vehicle above the battery pack and extends in a vertical direction of the vehicle on outer sides of the battery pack as viewed in the width direction of the vehicle, the gate shape portion having corner portions above the battery pack on the outer sides of the battery pack as viewed in the width direction of the vehicle, and
   an upper surface side of the battery pack is fixed to the corner portions.

2. The vehicle rear structure according to claim 1, wherein the upper surface side of the battery pack is fixed to the rear upper skeletal member via a fastening member.

3. The vehicle rear structure according to claim 2, wherein the fastening member includes
   a first surface configured parallel with the upper surface of the battery pack and having a first fastening portion facing the upper surface of the battery pack, and
   a second surface configured integrally with the first surface at an angle corresponding to an angle formed between the upper surface of the battery pack and a front surface of the rear upper skeletal member, and having a second fastening portion disposed at an outer side of the vehicle in the width direction relative to the first fastening portion, the second fastening portion being also disposed above the vehicle in the vertical direction of the vehicle to face the front surface of the rear upper skeletal member.

4. The vehicle rear structure according to claim 3, wherein the first and second fastening portions each include a long hole for fastening.

5. The vehicle rear structure according to claim 3, wherein the rear upper skeletal member is an upper back structural member including
   an upper back peripheral portion configured to partition a cabin and a luggage compartment of the vehicle, have its peripheral portion connected to a rear wheel arch portion, and extend in vertical and width directions of the vehicle from the rear wheel arch portion, and
   an upper back panel portion connected to the upper back peripheral portion and extending to the upper side of the luggage compartment in front-rear and width directions of the vehicle, wherein
   the upper surface of the battery pack is fastened via the fastening member to a corner portion provided between an extending portion in the width direction of the vehicle and an extending portion in the vertical direction of the upper back peripheral portion.

6. The vehicle rear structure according to claim 5, wherein the fastening member includes
   a bead portion formed in parallel with a direction connecting the first and second fastening portions.

7. A vehicle rear structure, comprising:
   a pair of side members disposed on right and left sides of a vehicle in a width direction of the vehicle and extending in a front-rear direction of the vehicle;
   a battery pack with a bottom surface side fastened to the side members;
   a rear upper skeletal member extending in the width direction of the vehicle above the battery pack; wherein the rear upper skeletal member has a gate shape portion that includes a left upper back peripheral portion, a right upper back peripheral portion, and an upper back panel portion, wherein
   the left upper back peripheral portion and the right upper back peripheral portion extend in a vertical direction of the vehicle on outer sides of the battery pack as viewed in the width direction of the vehicle,
   the upper back peripheral portion extends in the width direction of the vehicle above the battery pack to be connected to the left upper back peripheral portion and the right upper back peripheral portion,
   the gate shape portion has corner portions above the battery pack on the outer sides of the battery pack as viewed in the width direction of the vehicle, and
   an upper surface side of the battery pack is fixed to the corner portions.

8. The vehicle rear structure according to claim 7, wherein the upper surface side of the battery pack is fixed to the rear upper skeletal member via a fastening member.

9. The vehicle rear structure according to claim 8, wherein the fastening member includes
- a first surface configured parallel with the upper surface of the battery pack and having a first fastening portion facing the upper surface of the battery pack, and
- a second surface configured integrally with the first surface at an angle corresponding to an angle formed between the upper surface of the battery pack and a front surface of the rear upper skeletal member, and having a second fastening portion disposed at an outer side of the vehicle in the width direction relative to the first fastening portion, the second fastening portion being also disposed above the vehicle in the vertical direction of the vehicle to face the front surface of the rear upper skeletal member.

10. The vehicle rear structure according to claim 9, wherein
the first and second fastening portions each include a long hole for fastening.

11. The vehicle rear structure according to claim 9, wherein
the rear upper skeletal member is an upper back structural member including the left upper back peripheral portion and the right upper back peripheral portion, the upper back structural member being configured to partition a cabin and a luggage compartment of the vehicle, have the left upper back peripheral portion and the right upper back peripheral portion connected to respective rear wheel arch portions, and extend in vertical and width directions of the vehicle from the rear wheel arch portions, and
an upper back panel portion connected to the left upper back peripheral portion and the right upper back peripheral portion and extending to the upper side of the luggage compartment in front-rear and width directions of the vehicle, wherein
the upper surface of the battery pack is fastened via the fastening member to a corner portion provided between an extending portion in the width direction of the vehicle and an extending portion in the vertical direction of the upper back peripheral portion.

12. The vehicle rear structure according to claim 11, wherein
the fastening member includes
a bead portion formed in parallel with a direction connecting the first and second fastening portions.

* * * * *